United States Patent [19]

Massey et al.

[11] Patent Number: 4,506,372
[45] Date of Patent: Mar. 19, 1985

[54] METHOD AND APPARATUS FOR RECOGNIZING IN A RECEIVER THE START OF A TELEGRAM SIGNAL CONSISTING OF A BIT IMPULSE SEQUENCE

[75] Inventors: James L. Massey, Zurich; Thomas Schaub, Thalwil, both of Switzerland

[73] Assignee: LGZ Landis & Gyr Zug AG., Zug, Switzerland

[21] Appl. No.: 440,190

[22] Filed: Nov. 9, 1982

[30] Foreign Application Priority Data

Nov. 11, 1981 [CH] Switzerland .................. 7251/81

[51] Int. Cl.³ ............................................. H04L 7/00
[52] U.S. Cl. ..................................... 375/116; 364/728; 371/46
[58] Field of Search .................. 375/110, 115–117, 375/106; 370/19, 47, 49; 371/46, 47; 364/728; 178/113

[56] References Cited

U.S. PATENT DOCUMENTS

| 3,251,034 | 5/1966 | Goode et al. | 371/47 |
| 3,317,669 | 5/1967 | Ohnsorge | 371/47 X |
| 4,079,195 | 3/1978 | Frutiger | 375/115 X |
| 4,168,529 | 9/1979 | Tomlinson | 375/115 X |
| 4,214,209 | 7/1980 | Baier et al. | 375/1 |
| 4,280,222 | 7/1981 | Flower | 375/115 X |

FOREIGN PATENT DOCUMENTS 1287014  1/1962  France .
2004164  3/1979  United Kingdom .

OTHER PUBLICATIONS

Chip Looks for 64-Bit Word, Electronics Int., Oct. 23, p. 260.
Branch Synchronization Schemes for Convolutional Codes, Wai-Hung Ng. Proc. I.E.E., Jun. 1976, pp. 481–484.
Nachrichten techn.Zeitschrift, Gerhard Groth, vol. 32, (1979), Issue 2, pp. 86–88.

Primary Examiner—Robert L. Griffin
Assistant Examiner—Stephen Chin
Attorney, Agent, or Firm—Ernest F. Marmorek

[57] ABSTRACT

In an apparatus and a method for recognizing the start of a noise-corrupted received telegram signal, and wherein the telegram signal consists of an information-containing sequence of bits ahead of the telegram signal, thereafter transmitting an intermediate sequence of bits following the preliminary sequence, but still ahead of the telegram signal, wherein the preliminary and the intermediate sequences are correlated with different parts of the preliminary and of the intermediate sequence in a pre-arranged manner, and detecting the pre-arranged manner so as to positively signal termination of the intermediate sequence; recognition of the start of the telegram signal is thereby ensured.

13 Claims, 4 Drawing Figures

METHOD AND APPARATUS FOR RECOGNIZING IN A RECEIVER THE START OF A TELEGRAM SIGNAL CONSISTING OF A BIT IMPULSE SEQUENCE

BACKGROUND OF THE INVENTION

Use of a (2,1)-convolutional code for bit synchronization is known from the article "Branch Synchronization Schemes for Convolutional Codes" Wai-Hung Ng, proc. IEE Volume 123, No. 6, June 1976, pgs. 481–484.

SUMMARY OF THE INVENTION

One of the principal objects of the invention is to devise a simple bit synchronization which does not require any convolutional code, or which can be utilized in combination with such a convolutional code for synchronization of a bit sequence.

This object ist attained in a method and an apparatus for recognizing the start of a noise-corrupted received telegram signal and wherein the telegram signal consists of an information-containing sequence of bits by transmitting a preliminary sequence of bits ahead of the telegram signal, thereafter transmitting an intermediate sequence of bits following the preliminary sequence, but still ahead of the telegram signal, wherein the preliminary and the intermediate sequences are correlated with different parts of the preliminary and of the intermediate sequence in a prearranged manner, and detecting the pre-arranged manner so as to positively signal termination of the intermediate sequence. Recognition of the start of the telegram signal is thus ensured.

Other objects of the invention will in part be obvious, and will in part appear hereinafter.

BRIEF DESCRIPTION OF THE DRAWINGS

For a fuller understanding of the nature and objects of the invention, reference should be had to the following detailed description, taken in connection with the accompanying drawings in which.

Identical reference numerals in each Fig. denote similar parts.

DESCRIBTION OF THE PREFERRED EMBODIMENTS

Figure 1:
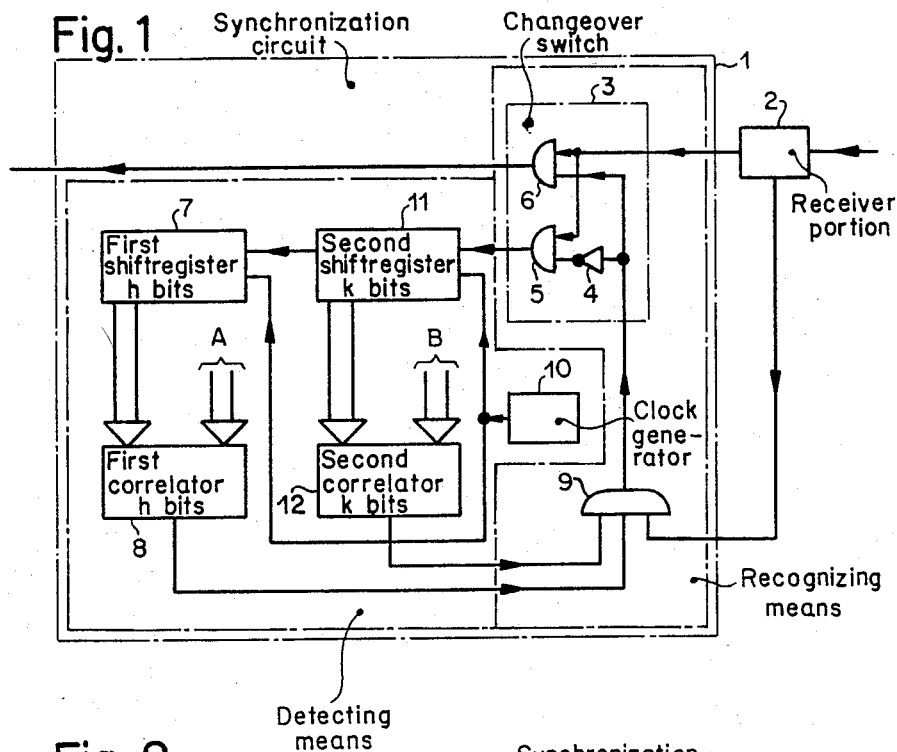
FIG. 1 is a block diagram of a synchronizing circuit for an uncoded sequence of bits.
Figure 2:
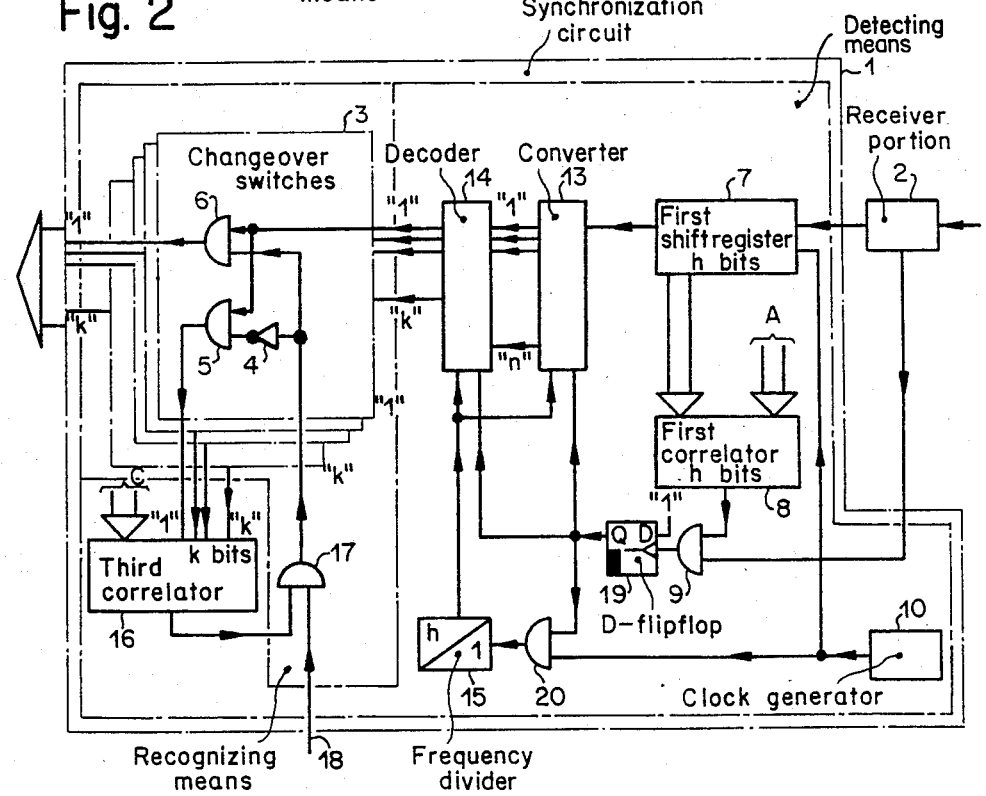
FIG. 2 is a block diagram of a synchronizing circuit for a coded sequence of bits.

Both the circuit according to FIG. 1 as well as the circuit according to FIG. 2 consists of a synchronization circuit 1 and a receiver portion 2, each forming part of a common receiver.

In both cases the receiver portion 2 has a single input, a signal output and a "ready" output, and the synchronization circuit 1 has a signal input connected to the signal output of the receiver portion 2, a release input connected to the ready output of the receiver portion 2, and a telegram signal output, which in the case of FIG. 1, is single pole, but in the case of FIG. 2 is a k-bit data bus; in the simplest case k=1, so that the synchronization circuit 1 according to FIG. 2 then has a single pole telegram signal output also.

The synchronization circuit 1 according to both Figs. includes inter alia:

a single changeover switch (FIG. 1) or k changeover switches 3 (FIG. 2) each consisting of an inverter 4, a first AND gate 5, and a second AND gate 6, each of these AND gates having two inputs;

a first shift register 7 and a first correlator 8 associated with the first shift register;

a third AND gate 9, which has three inputs in the case of FIG. 1, and two inputs in the case of FIG. 2; and a clock generator 10.

The synchronizing circuit 1, according to FIG. 1 additionally includes a second shift register 11 and a second correlator 12 associated with the second shift register 11, while the circuit according to FIG. 2 additionally includes a series-to-parallel converter 13, a decoder 14, a frequency divider 15, a third correlator 16, a fourth AND gate 17 having two inputs, a reset input 18, a D-flip flop 19, and a fifth AND gate 20 having two inputs.

The two shift registers 7 and 11 are digital shift registers and have each a single clock input, a single series input as well as a single series output, and a single x-bit parallel output. Each correlator 8 and 12 has a first and a second parallel input of x-bits, as well as a single pole output. The x-bit parallel output of one of the shift registers 7 or 11 is connected through an x-bit data bus connection to the first x-bit input of the associated correlator 8 or 12. A first digital x-bit reference word "A" appears on the second x-bit input of the first correlator 8, and, if available, a second digital x-bit reference word "B" appears on the second x-bit input of the correlator 12.

Figure 3:
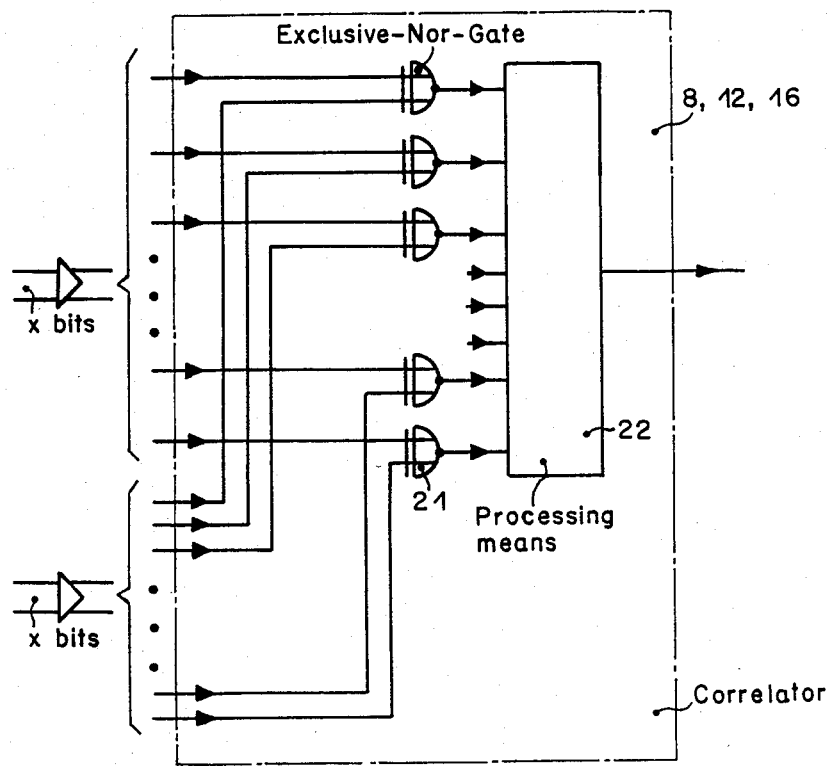
FIG. 3 is a block diagram of correlator.

Each of the correlators 8 and 12 consists of "x" non-exclusive OR gates 21 (see FIG. 3), each having two inputs, which control in each correlator 8 or 12 a common processing means 22. If the number of binary values "1" at the output of the "x" non-exclusive OR gates of one of the correlators 8 or 12 exceeds a predetermined limit value $q<x$, then there appears at the single output of the associated processing means, which is also the output of the corresponding correlator 8 or 12, a binary value "1".

Figure 4:
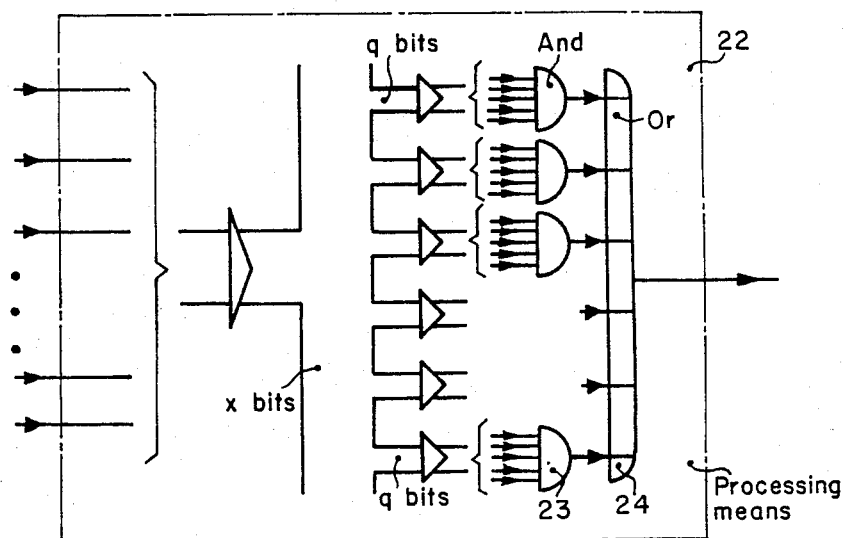
FIG. 4 is a diagram of a processing means

Each processing means 22 includes, for example (see FIG. 4), a AND-OR gate, which in turn consists of $$\binom{x}{q} = x!/[q!(x-q)!]$$

of not yet mentioned AND gates 23, which each have q inputs and control a common OR gate 24, whose output forms the output of the processing means. Each combination of "x" outputs of the non-exclusive OR gates 21 of each correlator 8 or 12 of the $q^{th}$ class is associated with one of the AND gates 23 of the AND-OR gate, wherein q of these outputs are respectively connected to the q inputs of one of these AND gates 23, without a certain combination of these outputs being ever repeated.

In FIG. 1 the following additional single-pole connections exist:

a release input of the synchronizing circuit 1 is connected to the first input of the third AND gate 9;

the output of the first correlator 8 is connected to the second input of the third AND gate 9;

the output of the second correlator 12 is connected with the third input of the third AND gate 9;

the single output of the clock generator 10 is connected to the two clock inputs of the first and the second shift register 7 and 11 connected to one another;

the output of the third AND gate 9 is connected directly to the first input of the second AND gate 6 and is connected through the inverter 4 with the first input of the first AND gate 5;

the signal input of the synchronizing circuit 1 is connected to the second input of the first and second AND gates 5 and 6, which in turn are connected to one another;

the output of the first AND gate 5 is connected with the series input of the second shift register 11 and its series output is connected with the series input of the first shift register 7, its series output not being utilized however; and the output of the second AND gate 6 is connected with the telegram output of the synchronization circuit 1.

In FIG. 2 the following additional connections exist:

the signal input of the synchronizing circuit 1 is connected to the series input of the first shift register 7, and its series output is connected to the single series input of the series-to-parallel converter 13;

the release input of the synchronizing circuit 1 is connected to the first input of the third AND gate 9;

the output of the first correlator 8 is connected with the second input of the third AND gate 9, and its output with the single clock input of the D-flip flop 19;

the Q output of the D-flip flop 19 is connected to the single enable inputs of the series-to-parallel converter 13 and of the decoder 14 connected to one another, as well as with the first input of the fifth AND gate 20;

the single output of the clock generator 10 is connected to the second input of the fifth AND gate 20 and with the clock input of the first shift register 7;

the output of the fifth AND gate 20 is connected with the single input of the frequency divider 15;

the single D-input of the D-flip flop 19 has at its input a binary value "1";

the n data outputs of the series-to-parallel converter 13 are connected to the "n" data inputs of the decoder 14, and its "k" data outputs with the respective single data inputs of the "k" changeover switches 3, wherein each data input of a switch 3 is in turn connected to the first inputs of the first and second AND gates 5 and 6, which first inputs are connected to one another.

the single output of the frequency divider 15 is connected to the single clock inputs of the series-to-parallel converter 13 and of the decoder 14, which, in turn, are connected to one another.

the output of the k AND gates 5 are connected to a first "k"-bit input of the third correlator 16, and its output is connected to a first input of the fourth AND gate 17, its second input receiving a reset signal 18;

the output of the fourth AND gate 17 is connected directly to the respective input of the "k" second AND gates 6, and through a respective of the "k" inverters 4 with the second input of the corresponding "k" AND gates 5; and the outputs of the k second AND gates 6 are connected to the k-bit parallel telegram outputs of the synchronizing circuit 1.

The following relations apply: for the first shift register 7, for the first digital reference word A, and for the first correlator 8, $x=h$, and for the second shift register 11, the second reference word B and the second correlator 12, $x=k$, wherein h and k are integers.

At a second k-bit input of the third correlator 16, which has a structure similar to the structure of correlators 8 and 12, there appears a third digital k-bit reference word C.

The receiver portion 2, the clock generator 10, and the frequency divider 15 are known electronic circuits; the decoder 14 is preferably a known Viterbi decoder implemented by means of a microcomputer. These circuits are not subject of a claim, and are therefore not further described in detail. For all remaining circuits, digital components of the TTL series 74 . . . of e.g. Texas Instruments, Dallas, Tex., may be utilized.

Before the operation of the circuits, according to the present invention is described, there follows for easy reference a listing of the symbols employed hereinafter:

x: number of exclusive NOR gates 21, and number of parallel output cells of a shift register 7 or 11 q: limit value of the number of binary values "1" at the outputs of the exclusive NOR gates 21 m: number of bits of a preliminary sequence k: number of bits of an uncoded intermediate sequence h: number of bits in the first digital reference word A and the number of cells in the first shift register 7 n: number of bits of a period of a coded preliminary sequence and number of bits of the coded intermediate sequence

OPERATION

A received signal at the input of the receiver portion 2 is conditioned in a known and therefore not further described manner, for example by filtering, demodulation, level regulating and the like, and appears as a bit impulse sequence at the signal input of the synchronizing circuit 1. As soon as the received parameters, for example level values, have been conditioned so as to result in an acceptable quality in the receiver portion 2, then there appears at the ready output of the receiver portion 2 a binary value "1" and releases the third AND gate 9 for the remaining input signals. The aforedescribed bit sequence consists, in sequence, of the aforesaid preliminary sequence V, of an intermediate sequence Z and of a telegram signal T. The telegram signal T is the information-containing signal.

The preliminary sequence V consists, for example of m alternating binary values "1" and "0". The intermediate sequence Z and the telegram signal T are either uncoded or are coded by means of a (n,k) convolutional code, and are then denoted as Z' and T'.

The uncoded intermediate sequence Z consists of k-bits and is chosen in the uncoded version so that the following correlations are as small as possible:

correlation between the intermediate sequence Z with the last k-bits of the preliminary sequence Z;

correlation of the first two j-bits of the intermediate sequence Z with the last two j-bits of the preliminary sequence V; and correlation of the first two j-bits of the intermediate sequence Z with the last two j-bits of the intermediate sequence Z in the case of even k, or correlation of the first $(2j-1)$ bits of the intermediate sequence V with the last $(2j-1)$ bits of the intermediate sequence Z in the case of k being odd.

It should be noted that $j=1,2\ldots,(k/2-1)$ in the case of k being even, and $j=1,2\ldots,(k-1/2)$ in the case of k being odd.

EXAMPLES m = 14 (preliminary sequence)

k=8 (intermediate sequence)
preliminary sequence V: 10101010101010 (14 bits)
intermediate sequence Z: 01011100 (8 bits)
preliminary sequence V: 01010101010101 (14 bits)
intermediate sequence Z: 10101100 (8 bits)

In the coded version the k successive bits form the uncoded intermediate sequence Z, which is converted by means of a (n,k) convolutional code into the coded intermediate sequence Z' which is to be transmitted.

Operation of the Uncoded Version according to FIG. 1

Normally there appears at the output of the third AND gate 9 the binary value "0", so that all second AND gates 6 are inhibited, and simultaneously all first AND gates 5 are released through the respective inverter or inverters 4.

Both shift registers 7 and 11 are connected in series and form together a single (h+k) bit shift register. Into this shift register there are transmitted through the released first AND gate 5, in sequence, in the drawing from right to left, the preliminary sequence V and the intermediate sequence Z by means of the clock impulses supplied by the clock generator 10. Based on the assumption that, for example m>(h+k), the (h+k) storage cells of the two shift registers 7 and 10 are occupied with the last (h+k) bits of the preliminary sequence V, as soon as there appears on the input of the second shift register 11 the first bit of the intermediate sequence Z. This period of time is denoted as t=0.

The further operation will now be illustrated in more detail by means of an example wherein h=5 and by means of the Table I shown overleaf.

The following relationships apply: m=14, (h+k)=13 wherein m>(h+k).

The transmitted bit sequence is:

V; Z; T=10101010101010, 01011100, T

The first reference word A equals the last h bits of the preliminary sequence V, namely in the example chosen is equal to the 5 last bits "01010" of the fourteen bits of the preliminary sequence V.

The second reference word B is equal to the preliminary sequence Z, namely equal to "01011100".

Each new clock impulse of the clock generator 10 shifts the contents of $SR_t$ of the (h+k) bit shift register shown in FIG. 1 and Table 1 by one location from right to left, while simultaneously the bit appearing on the series input of the second shift register 11 is shifted to the first right-most storage cell of that shift register 11.

In Table 1:

The lines $SR_t$ denotes the contents of the (h+k) bit shift register at the period t;

The row X denotes the contents of the first shift register 7; and

The row Y denotes the contents of the second shift register 11.

As has already been mentioned, at the time t=0 the contents $SR_0$ of the (h+k) bit shift register is equal to the last (h+k)=13 bits of the preliminary sequence V, namely "0101010101010", and the first bit of the intermediate sequence Z "01011100", namely "0" appears at the input of the second shift register 11. The value t is the continuous count of the clock impulses of the clock generator 10 since the time t=0.

For example, after three such clock impulses the time t=3 has been reached, and the contents of the (h+k) bit shift register is equal to $SR_3$, namely equal to "1010101010010".

A line in the form of a stair step shown in Table 1 separates the preliminary sequence V from the intermediate sequence Z. In the last t storage cells of the (h+k) bit shift register there are stored always the first t bits of the intermediate sequence Z based on the afore-noted assumption, as read from left to right.

The last line of Table 1 contains the reference words, namely in column X the first reference word A, namely "01010" and in column Y the second reference word, namely "01011100" are shown.

In Table 1 both bits of $SR_t$ which are correlated with the associated bit of the corresponding first or second respective reference word A or B, namely which are identical with this bit, are underlined; their number is a correlation value shown in the last two columns of Table 1. From the penultimate column, namely the column shown under X in Table 1, it can be seen that during the reception of non-corrupted bits during odd values of t, the correlation for X is minimal and equal to 0, and during even values of t is maximal and equal

TABLE 1

| Bit No. | X | | | | | Y | | | | | | | | Correlation Value of | |
|---------|---|---|---|---|---|---|---|---|---|----|----|----|----|---|---|
| | 1 | 2 | 3 | 4 | 5 | 6 | 7 | 8 | 9 | 10 | 11 | 12 | 13 | X | Y |
| $SR_0$ | 0 | 1 | 0 | 1 | 0 | 1 | 0 | 1 | 0 | 1 | 0 | 1 | 0 | 5 | 2 |
| $SR_1$ | 1 | 0 | 1 | 0 | 1 | 0 | 1 | 0 | 1 | 0 | 1 | 0 | 0 | 0 | 7 |
| $SR_2$ | 0 | 1 | 0 | 1 | 0 | 1 | 0 | 1 | 0 | 1 | 0 | 0 | 1 | 5 | 2 |
| $SR_3$ | 1 | 0 | 1 | 0 | 1 | 0 | 1 | 0 | 1 | 0 | 0 | 1 | 0 | 0 | 5 |
| $SR_4$ | 0 | 1 | 0 | 1 | 0 | 1 | 0 | 1 | 0 | 0 | 1 | 0 | 1 | 5 | 2 |
| $SR_5$ | 1 | 0 | 1 | 0 | 1 | 0 | 1 | 0 | 0 | 1 | 0 | 1 | 1 | 0 | 4 |
| $SR_6$ | 0 | 1 | 0 | 1 | 0 | 1 | 0 | 0 | 1 | 0 | 1 | 1 | 1 | 5 | 3 |
| $SR_7$ | 1 | 0 | 1 | 0 | 1 | 0 | 0 | 1 | 0 | 1 | 1 | 1 | 0 | 0 | 4 |
| $SR_8$ | 0 | 1 | 0 | 1 | 0 | 0 | 1 | 0 | 1 | 1 | 1 | 0 | 0 | 5 | 8 |
| Reference Word | 0 | 1 | 0 | 1 | 0 | 0 | 1 | 0 | 1 | 1 | 1 | 0 | 0 | | |
| | | | A | | | | | | B | | | | | | | h=5. If individual or several bits are falsified due to interference, then it is true that these correlation values of X are decreased; at a high probability these values will not, however, reach the average value of (h/2)=2.5. The first correlator 8 generates on its output, and therefore on the associated input of the third AND gate 9 only then a binary value "1", if the correlation value of X exceeds a limit value $q_1 \geq (h/2)$. Depending of the length of the preliminary sequence V the correlator 8 has several possibilities to recognize the reference word A. It is therefore advisable to select the limit value $q_1$ for relatively long preliminary sequences greater than h/2, so as to obtain better protection from an erroneous actuation of the AND gate 9. Thus only the contents $SR_t$ received and stored in the (h+k) bit shift register having an even value of t are significant for the start-synchronization. All values of $SR_t$ with an odd value of t have no significance and in what follows can be neglected, as they never enable the third AND gate 9 through its second input. Thus, recognition of the start of the telegram signal is blocked when $q_1 < h/2$.

As can be ascertained from the last column of Table 1, in the case of even values of t, the correlation values of Y are equal to 2,2,2,3 and t=8. All these correlation values are very low, with the exception of the last value k=8. If a high limit value $q_2 < k$ is chosen for the second correlator 12, for example an approximately intermediate value of 6 between the highest values 3 and k=8, then the second correlator 12 enables the third AND gate 9 postcoupled thereto through its third input definitely only at the time t=k=8. This is, however, the very time at which the intermediate sequence Z is terminated and where the next bit signals the commencement of the telegram signal T. This release is correctly accomplished as long as any bit errors caused by interference do not exceed the correlation values of X or Y in terms of the associated limit value $q_1$ or $q_2$, respectively, in one or the other direction.

If at the ready output of the receiving portion 2 there appears a logical value "1", then at the time t=k=8 the third AND gate 9 is definitely enabled so that the logic value "1" switches over the switch 3 at its output, by this time inhibiting the first AND gate 5 and simultaneously enabling the second AND gate 6. The telegram signal T following the intermediate sequence therefore reaches through the second AND gate 6 the output of the synchronizing circuit 1. The third AND gate 9 therefore is the last link in the chain of the detecting and recognizing means including the intermediate sequence, the shift register 11, the correlator 12 and the second reference word B, which positively signal termination of the intermediate sequence. The first bit appearing at this telegram signal output is recognized by a (non-illustrated) portion of the receiver postcoupled to the synchronizing circuit 1 as a first bit of the telegram signal t and accepted as such, so that the commencement of the processing, and therefore the commencement of synchronization of this telegram signal T is accomplished at the correct moment in time in spite of possible bit corruptions.

Operation of the Coded Version according to FIG. 2

The preliminary sequence V, the coded intermediate sequence Z', and the coded telegram signal T' are sequentially shifted in FIG. 2 from right to left into the first and single shift register 7. The preliminary sequence V is an n-bit periodic sequence which has been coded with the aid of a (n,k) convolutional code from an uncoded k-bit periodic sequence. The first of these coded combinations need not absolutely be complete on their left sides. The correlation of one period of the preliminary sequence V with two consecutive periods shifted by t bits of that preliminary sequence must be as small as possible, namely $0 < t < n$. The h-bit reference word A is composed of the last h-bits of the preliminary sequence V.

Example n=2,
n-bit combination="10",
preliminary sequence V=0101010101010 wherein m=13,
reference word A=01010, wherein h=5.

After the first shift register 7 has been filled, with the h-bits of the preliminary sequence V, and after the initial incomplete part of the n-bit combination has left the first shift register 7, the contents of this first shift register 7 agrees the first time with the first reference word A, based on the assumption that the received and stored bits of the preliminary sequence V have not been falsified by any interferences. If, however, errors have occurred in the sequence, the first correlator 8, whose limit value $q_1$ is again $\geq (h/2)$ generates at this moment in time, nevertheless, at its output a binary value "1" for the same reasons which have already been explained when describing the operation of the uncoded version of the invention. This is repeated each "n" bit times up to the moment when a binary value "1" appears both on the ready output of the receiver portion 2 as well as on the output of the first correlator 8. Depending on the length of the preliminary sequence V the correlator 8 has several possibilities to recognize the reference word A. Here it is also advisable to select the limit value $q_1$ for relatively long preliminary sequences larger than h/2, so as to obtain better protection from any erroneous actuation of the third AND gate 9. At the output of the third AND gate 9 there appears then the binary value "1", whose positive-going edge flips over the D-flip flop 19 post-coupled thereto, so that its Q-output releases on one hand the series-to-parallel converter 13 and the decoder 14 through its enable inputs as well as the frequency divider 15 through the fifth AND gate 20. By means of this signal at the "enable" input of the decoder 14, the decoder 14 is brought into the state in which it would remain, if at its data inputs there would always appear the "n" bit combination of an intermediate sequence period. For all (n,1) codes this state corresponds to the 11 ... 1 state, as it has been generated by an input sequence of only "1's". If the Viterbi decoding algorithm described in the "The Theory of Information and Coding" R. J. McEliece, Addison-Wesley Publishing Comp. 1977, Page 211, is used, then initialization is achieved by associating with the state 11 ... 1 a high initial metric so as to set the metric of the other states equal to 0. From this time of release the frequency divider 15 divides the frequency of the clock impulses of the clock generator 10 by "n" and subsequently feeds the series-to-parallel converter 13 and the decoder 14 with this frequency-divided clock signal.

The n-bits of the n-bit combination following thereto at this moment of release are distributed through the series-to-parallel converter 13 to its "n" data outputs, and therefore to all "n" data inputs of the decoder 14, so that at its "n" data inputs there appear successively in time the individual n-bit combinations in parallel, and are decoded by the decoder 14 sequentially into a decoded k-bit word.

As long as the n-bit combinations of the preliminary sequence V appear on the data inputs of the decoder 14, the data at the k data outputs remain equal from one decoding step to another and in the case of the (2,1) convolutional code there would appear successive binary values "1". If at the reset input 18 of the gate 17 a binary value "1" appears, and if the third digital reference word C consists of the uncoded intermediate sequence, and if the limit value of the third correlator 16 $q_3=k$, then during the preliminary sequence V the AND gate 17 is inhibited. Thus the AND gates 5 are released through the inverter 4 and simultaneously the AND gates 6 are blocked. The coded intermediate sequence Z is always selected so that it has a Hamming distance to an n-bit period of the preliminary sequence V as large as possible.

In the case of the (2,1) convolutional code, the uncoded intermediate sequence is, for example, equal to "0" the coded sequence equal to "01" or "10", wherein $q_3=1$.

If, following the preliminary sequence V the n-bit combination of the intermediate sequence Z is decoded, then there appears on the data output of the decoder 14, and consequently on the first k-input of the third correlator 16 the uncoded k-bit intermediate sequence which is equal to the third digital reference word C. Thus there appears at the output of the third correlator 16 the binary value "1", the AND gate 17 is enabled, and the next k-output bits of the decoder 14 reach through the k switches 3 the telegram output of the synchronizing circuit 1.

If a (2,1) convolutional code is used, then the decoded intermediate sequence of the length one is equal to "0". Thus the correlator 16 is reduced to an inverter, the third reference word C is redundant, the dividing ratio of the frequency divider 15 becomes 2, and is therefore reduced to a single flip flop, the k-bit telegram output of the synchronizing circuit 1 consists then only, as in the uncoded version, of a single series output, and only a single switch 3 is required.

In this case the single n-bit combination of the coded intermediate sequence Z is equal, for example to the one complement "01" of the n-bit combination "10" of the preliminary sequence V, so that the transmitted and correct (non-falsified) coded bit impulse sequence with m=13 and m=2 appears as follows: V,Z,T'=0101010101010,01,T'.

The decoded bit impulse sequence is then at k=1:111111,0,T, wherein T' represents the coded telegram T. T' consists of a multiplicity of double bit combinations, where each of the double bits (n=2) is the (2,1) convolutional code word of the single bit (k=1) of the uncoded telegram T.

We wish it to be understood that we do not desire to be limited to the exact details of construction shown and described, for obvious modifications will occur to a person skilled in the art.

Having thus described the invention, what we claim as new and desire to be secured by Letters Patent is as follows:

1. In a method of recognizing the start of a noise-corrupted received telegram signal, said telegram signal consisting of an information-containing sequence of bits, the steps comprising transmitting a preliminary sequence of m bits ahead of the telegram signal, thereafter transmitting an intermediate sequence of k bits following said preliminary sequence, but still ahead of the telegram signal, said preliminary and intermediate sequences being correlated with different parts of said preliminary and intermediate sequences in a prearranged manner, wherein said intermediate sequence consists of k bits, wherein j denotes a number 1, 2 ... k, and wherein the correlation-establishing step includes minimizing the correlation between the last k bits of said preliminary sequence and of said intermediate sequence, the first 2j bits of said intermediate sequence and the last 2j bits of said preliminary sequence for values of the number j=1, 2 ..., (k/2)−1, k is even, and the first (2j−1) bits of said intermediate sequence with the last (2j−1) bits of said intermediate sequence, for values of the number j=1, 2 ... (k/2−0.5) when k is uneven, and detecting said pre-arranged manner so as to positively signal termination of said intermediate sequence, whereby recognition of the start of said telegram signal is ensured.

2. The method as claimed in claim 1, wherein both said intermediate sequence and said telegram signal are uncoded, further comprising the step of implementing said preliminary sequence by an alternating sequence of binary "1" values and binary "0" values and wherein said intermediate sequence consists of eight bits having one of the values "01011100" and "10101100".

3. In a method of recognizing the start of a noise-corrupted received telegram signal, said telegram signal consisting of an information-containing sequence of bits, the steps comprising transmitting a preliminary sequence of m bits ahead of the telegram signal, thereafter transmitting an intermediate sequence of k bits following said preliminary sequence, but still ahead of the telegram signal, said preliminary and intermediate sequences being correlated with different parts of said preliminary and intermediate sequences in a prearranged manner, wherein said preliminary sequence is initially a periodic uncoded sequence with periods of k bits, wherein said intermediate sequence is initially uncoded and consists in its uncoded state of k bits, and further comprising the steps of coding said intermediate sequence and said telegram signal with an identical (n, k) convolutional code, where k n, and where n is the number of bits of the coded intermediate sequence, and coding said preliminary sequence with an (n, k) convolutional code, so as to convert it to a n-bit periodic coded sequence, and wherein the coded intermediate sequence has as large a Hamming distance as possible from said n-bit periodic coded sequence;

minimizing the correlation between one period of said preliminary sequence and two consecutive periods of said preliminary sequence shifted by t bits for all values of O<t<n.

4. The method as claimed in claim 3, further comprising the step of implementing said n-bit periodic sequence by an alternating sequence of binary "1" values and binary "0" values for the case wherein n=2 and k=1.

5. The method as claimed in claim 3, further comprising the steps of implementing in the case n=2, and k=1, said initially uncoded intermediate sequence to be equal to "0", and implementing said coded intermediate sequence to be equal to one of "1" and "0".

6. An apparatus for recognizing the start of a noise-corrupted received telegram signal, and wherein the telegram signal consists of an information-containing sequence of bits and is preceded by a preliminary sequence of m bits and an intermediate sequence of k bits following the preliminary sequence, said preliminary and intermediate sequences being correlated with different parts of said preliminary and intermediate sequences in a prearranged manner,
   comprising in combination
   detecting means including a receiver for detecting said prearranged manner, so as to positively signal termination of said intermediate sequence, and
   recognizing means for distinguishing said preliminary and intermediate sequences from said telegram signal, so that recognition of the start of said telegram signal is ensured,
   said receiver including
      synchronizing means, said synchronizing means including a k-bit shift register having parallel outputs, an h-bit shift register having parallel outputs, a first correlator for said preliminary sequence cooperating with said h-bit shift register and having first and second h-bit inputs, a second correlator for said intermediate sequence cooperating with said k-bit register and having first and second k-bit inputs, and a change-over switch,
      said parallel outputs of said k-bit shift register being connected to said first k-bit input of said second correlator,
      a k-bit reference word being connected to said second k-bit input of said second correlator, said k-bit reference word being equal to said intermediate sequence,
      sad parallel outputs of said h-bit register being connected to said first h-bit input of said first correlator, and
      an h-bit reference word being connected to said second h-bit input of said first correlator, said h-bit reference word being equal to the last h bits of said preliminary sequence, and wherein (h=k)<m.

7. An apparatus for recognizing the start of a noise-corrupted received telegram signal, and wherein the telegram signal consists of an information-containing sequence of bits and is preceded by a preliminary sequence of m bits and an intermediate sequence of k bits following the preliminary sequence, said preliminary and intermediate sequences being correlated with different parts of said preliminary and intermediate sequences in a prearranged manner, said preliminary sequence being initially a periodic uncoded sequence,
   but being subsequently coded with an (n, k) convolutional code, so as to convert it to a n-bit periodic coded sequence, so as to minimize the correlation between one period of said preliminary sequence and two consecutive periods of said preliminary sequence shifted by t bits for all values of $0 < t < n$, said intermediate sequence being initially uncoded, but being subsequently coded together with said telegram signal with an identical (n, k) convolutional code, where $k < n$, and where n is the number of bits of the coded intermediate sequence, and wherein the coded intermediate sequence has as large a Hamming distance as possible from said n-bit periodic coded sequence;
   comprising in combination
   detecting means including a receiver for detecting said prearranged manner, so as to positively signal termination of said intermediate sequence, and
   recognizing means for distinguishing said preliminary and intermediate sequences from said telegram signal, so that recognition of the start of said telegram signal is ensured,
   said receiver including
      a synchronization circuit, including a D-flip flop, an h-bit shift register having parallel outputs, a first correlator cooperating with said h-bit shift register and having a first h-bit input and a second h-bit input, k changeover switches having k outputs, a series-to-parallel converter, and a third correlator having a first k-bit input and a second k-bit input,
      said parallel outputs of said h-bit shift register being connected to said first h-bit input of said first correlator, an h-bit reference word being equal to the last h bits of said preliminary sequence being connected to said second h-bit input of said first correlator,
      said k outputs of said change-over switches being connected to said first k-bit input of said third correlator, and
      a k-bit reference word being equal to said uncoded intermediate sequence being connected to said second k-bit input of said second correlator.

8. The apparatus as claimed in claim 6, wherein each of said correlators comprises a plurality of exclusive NOR gates, and includes a processing means having a plurality of p inputs, and providing a "1" output, if at least q of said p inputs receive a binary value of "1", and wherein $p > q$.

9. The apparatus as claimed in claim 7, wherein each of said correlators comprises a plurality of exclusive NOR gates, and includes a processing means; having a plurality of p inputs, and providing a "1" output, if at least q of said p inputs receive a binary value of "1", and wherein $p > q$.

10. The apparatus as claimed in claim 8, wherein $q = h/2$ for said first correlator.

11. The apparatus as claimed in claim 8, wherein $q = 6$ for said second correlator, when $k = 8$.

12. The apparatus as claimed in claim 9, wherein $q = h/2$ for said first correlator.

13. The apparatus as claimed in claim 9, wherein $q = k$ for said third correlator.

* * * * *